United States Patent
Wang

(10) Patent No.: US 6,756,457 B2
(45) Date of Patent: Jun. 29, 2004

(54) POLYMERIZATION PROCESS

(75) Inventor: Jin-Shan Wang, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/196,102

(22) Filed: Jul. 16, 2002

(65) Prior Publication Data

US 2004/0014919 A1 Jan. 22, 2004

(51) Int. Cl.[7] ........................... C08F 2/04; C08F 210/00
(52) U.S. Cl. ........................... 526/223; 526/348
(58) Field of Search ................... 526/223, 348

(56) References Cited

U.S. PATENT DOCUMENTS

| | | | |
|---|---|---|---|
| 6,306,995 B1 | 10/2001 | Wang | |
| 6,310,165 B1 | 10/2001 | Wang | |
| 6,596,899 B1 * | 7/2003 | Lai | 562/426 |

OTHER PUBLICATIONS

Otsu et al. "Features of Living Radical polymerization of Vinyl Monomers in Homogeneous System Using N,N–Diethyldithiocarbamate Derivatives as Photoiniferters" *Eur. Polym. J.* 31, 67 (1995).

Rizzardo et al. "Synthesis of Defined Polymers by Reversible Addition–Fragmentation Chain Transfer: The RAFT Process", ACS, pp. 278–296 (2000).

* cited by examiner

*Primary Examiner*—Robert D. Harlan
(74) *Attorney, Agent, or Firm*—Andrew J. Anderson

(57) ABSTRACT

A process for polymerization of vinyl monomers is described comprising polymerizing vinyl monomers in the presence of of an initiating system comprising (i) an organic sulfur compound and (ii) an onium salt catalyst. The present invention provides a novel method for living polymerization of vinyl monomers, which provides a high level of macromolecular control over the polymerization process and which leads to uniform and controllable polymeric products.

14 Claims, No Drawings

POLYMERIZATION PROCESS

FIELD OF THE INVENTION

The present invention relates to a novel process for living/controlled polymerization of vinyl monomers, particularly to use of a novel initiating system comprising an organic sulfur compound combined with an onium salt for living/controlled polymerization of vinyl monomers.

BACKGROUND OF THE INVENTION

Conventional chain polymerization of vinyl monomers usually consists of three main elemental reaction steps: initiation, propagation, and termination. Initiation stage involves creation of an active center from an initiator. Propagation involves growth of the polymer chain by sequential addition of monomer to the active center. Termination (including irreversible chain transfer) refers to termination of the growth of the polymer chain. Owing to the presence of termination and poorly controlled transfer reactions, conventional chain polymerization typically yields a poorly controlled polymer in terms of predicted polymer properties. Moreover, conventional chain polymerization processes mostly result in polymers with simple architectures such as linear homopolymer and linear random copolymer.

In 1950s, a so-called living polymerization was discovered by Szwarc (Szwarc, et al. J. Am. Chem. Soc. 78, 2656 (1956)). Living polymerization was characterized by the absence of any kinds of termination or side reactions which might break propagation reactions. The most important feature of living polymerization is that one may control the polymerization process to design the molecular structural parameters of the polymer. Additional polymerization systems where the termination reactions are, while still present, negligible compared to propagation reaction have also been disclosed. As structural control can generally still be well achieved with such processes, they are thus often termed "living" or controlled polymerization (Wang, Macromolecules, 28, 7901 (1995)). In living and "living" (or controlled) polymerization, as only initiation and propagation mainly contribute to the formation of polymer, molecular weight can be predetermined by means of the ratio of consumed monomer to the concentration of the initiator used. The ratio of weight average molecular weight to number average molecular weight, i.e., molecular weight distribution (Mw/Mn), may accordingly be as low as 1.0. Moreover, polymers with specifically desired structures and architectures can be purposely produced. In terms of topology, such structures and architectures may include: linear, star, comb, hyperbranched, dendritic, cyclic, network, and the like. In terms of sequence/composition distribution such structures and architectures may include: homopolymer, random copolymer, block copolymer, graft copolymer, gradient copolymer, tapered copolymer, periodic copolymer, alternating copolymer, and the like. In terms of functionalization, such structures and architectures may include: telechlics, macromonomer, labeled polymer, and the like.

A number of living/"living" polymerization processes have been developed. Examples of these polymerization processes include: anionic polymerization (Szwarc, J. Am. Chem. Soc. 78, 2656 (1956)), cationic polymerization (Sawamoto, Trends Polym. Sci. 1, 111 (1993)), ring opening methathesis polymerization (Gillium and Grubbs, J. Am. Chem. Soc. 108, 733 (1986)), nitroxides-mediated stable radical polymerization (Solomon, U.S. Pat. No. 4,581,429 (1986), Georges, Macromolecules, 26, 2987 (1993)), Cobalt complexes-mediated radical polymerization (Wayland, J. Am. Chem. Soc. 116, 7943 (1994)), and transition metal catalyzed atom transfer radical polymerization (Wang, U.S. Pat. No. 5,763,548 (1998)).

Living/"living" polymerization processes have been successfully used to produce numerous specialty polymeric materials which have been found to be very useful in many applications. One example is the commercialization of styrenic thermoplastic elastomers such as styrene-b-butadiene-b-styrene triblock copolymers (SBS) by Shell chemicals and others. SBS is made by sequential anionic living polymerization of styrene and butadiene. However, except for living anionic polymerization of non-polar monomers such as styrene and dienes using alkyl lithium as an initiator, almost all of other living/"living" systems mentioned-above currently showed little promise for wide industrial commercialization, mainly due to high cost to industrially implement these processes. Thus, searching for practical living/"living" polymerization processes is a major challenge in the field of polymer chemistry and materials.

Organic halide compounds have been used as initiator in several "living" polymerization systems. Sawamoto et al used a series of mixtures of alkyl halide and Lewis acid as initiating system in "living" cationic polymerization of vinyl ether, isobutylene, and styrene (Sawamoto, Trends Polym. Sci. 1, 111 (1993)). However, these cationic polymerizations required very restricted conditions such as moisture and impurities free reaction systems. Ganyor et al disclosed that combination of certain alkyl iodide with conventional radical initiator such as AIBN induced a "living" polymerization of styrene, methyl methacrylate, and methyl acrylate (Gaynor et al. Macromolecules 28, 8051 (1995)). The discovery of transition metal catalyzed atom transfer radical polymerization (ATRP) by Wang et al represents a very important step towards practical "living" polymerization (Wang, J. Am. Chem. Soc., 117, 5614 (1995), and U.S. Pat. No. 5,763,548). Using alkyl halide as an initiator and transition metal species as a catalyst, ATRP not only works well with a very broad variety of important vinyl monomers but also provides much easier pathway towards a variety of polymers with various structure and architectures. However, the use of heavy transition metal salts or complexes requires multi-step purification of the resultant polymers. Moreover, heavy transition metal salts or complexes are often toxic and not environmentally friendly. These drawbacks limit the wide implementation of current version ATRP process in industrial production.

An initiating system comprising an alkyl halide and an onium salt has been also found to be effective in promoting "living" polymerization. Reetz (Reetz et al. Macromol. Rapid Commun. 17, 383 (1996)) disclosed that while neither diethyl or dimethyl iodomethylmalonate nor tetra-n-butylammonium iodide alone initiated the polymerization of methyl methacrylate (MMA), a "living" polymerization of MMA was achieved by using diethyl or dimethyl iodomethylmalonate/tetra-n-butylammonium iodide (1/1) as an initiating system in polar solvents. The controlled poly (methyl methacrylate) was obtained in the number-average molecular weight range of 2000 to 8000, with molecular weight distribution being fairly narrow (ratio of weight- to number-average molecular weights Mw/Mn 1.2–1.3). Although the underlying mechanism is still unclear, the onium salt used acts as a catalyst in this homogenous polymerization system. In comparison with other "living" systems, the alkyl iodide/ammonium salt combined catalyst system disclosed by Reetz represents a simpler and cleaner one towards "living" polymerization. Due to the instability of iodide containing organic compounds, however, such process may not be commercially feasible, and it has been found that more stable alkyl chlorides or bromides alone are not reactive enough to react with onium salt to generate initiating species in chain polymerization.

Phase-transfer catalysis, PTC, was first coined by Starks in 1971 (J. Am. Chem. Soc., 93, 195 (1971)). It has been widely and practically used in various preparative organic, organometallic and polymer chemistry. PTC is a technique for conducting reactions between two or more reagents in one or two or more phases, when reaction is inhibited because the reactants cannot easily come together and one reagent is not reactive enough towards another one. A "phase-transfer agent" is added to transfer one of the reagents to a location where it can conveniently and rapidly react with another reagent. Two types of phase transfer agents are found efficient: quaternary salts and certain chelating reagents such as crown ethers, cryptands, poly (ethylene glycol) and their derivatives.

Traditional fields of polymer chemistry like radical, anionic and condensation polymerizations, as well as chemical modification of polymers, have substantially benefited from the use of phase transfer catalysis (Starks, Phase-Transfer Catalysis, ACS Symposium Series 326, 1987). Much work has been reported, e.g., on the use of phase transfer catalysis in condensation polymerization for the synthesis of polyester, polysulfonates, polyphosphonates, polysulfones, polythioesters, polyamides, polycarbonate, etc (see: Percec, in Phase-Transfer, Chapter 9, Starks Ed., ACS Symposium Series, Vol. 326 (1987)). It was often noticed that, in the absence of catalyst, only low molecular weight condensation polymer was produced even after long periods of time, whereas with the presence of the onium catalyst, high molecular weight of polymer was achieved after relatively short periods of time.

Phase transfer catalysis has been also used in chain polymerization. Rasmussen and co-workers have disclosed that many free radical polymerizations of acrylic monomers can be conducted in two-phase systems using potassium persulfate and either crown ethers or quaternary ammonium salts as initiators (Rasmussen et al. in, Phase-Transfer Catalysis, ACS Symposium Series 326, Starks Ed., p 116, 1987). When transferred to the organic phase, persulfate performs far more efficiently as an initiator than conventional initiators such as azobisisobutyronitrile or benzoyl peroxide. Photopolymerization of methyl methacrylate with quaternized ammonium salt-potassium thiocyanate-$CCl_4$ was also reported (Shimada, S. Polym. J. 30, 152 (1998)). However, all disclosed polymerization processes under phase transfer conditions were not living or "living". The monomer conversion to polymer was often very low; molecular weight can not be controlled; and molecular weight distribution is very broad (Mw/Mn often more than 2).

Use of organic sulfur compounds is also known in living/controlled polymerization. Otsu et al. "Features of Living Radical polymerization of Vinyl Monomers in Homogeneous System Using N,N-Diethyldithiocarbamate Derivatives as Photoiniferters" Eur. Polym. J. 31, 67 (1995), e.g., reports that radical photopolymerization of vinyl monomers with some sulfur compounds containing an N,N-diethyldithiocarbamyl group as photoiniferters proceeds via a living radical polymerization mechanism. Rizzardo et al. "Synthesis of Defined Polymers by Reversible Addition-Fragmentation Chain Transfer: The RAFT Process", ACS, pp. 278–96 (2000), discloses a radical polymerization process using a suitable thiocarbonylthio compound as an initiator and a typical radical initiator as a catalyst. The selection of particular sulfur compounds and/or reaction conditions, however, are described as being critical for such prior processes to function effectively.

Wang U.S. Pat. No. 6,306,995 discloses a process for polymerization of vinyl monomers comprising (a) forming an initiator comprising an organic iodide compound by reacting an initiator precursor comprising an organic bromide or chloride compound with an inorganic iodide salt under phase transfer catalysis in the presence of a phase transfer agent, and (b) polymerizing vinyl monomers in the presence of the formed initiator and a polymerization catalyst comprising an onium salt. Wang U.S. Pat. No. 6,310,165 discloses another process for polymerization of vinyl monomers comprising (a) forming an onium salt complex comprising a transition metal component by reacting an onium salt with a transition metal species, and (b) polymerizing vinyl monomers in the presence of the formed transition metal containing onium salt and an organic halide initiator compound. There is no disclosure, however, in such patents of the use of initiating systems employing organic sulfur compounds in combination with onium salts.

It would be desirable to provide a novel method for living polymerization of vinyl monomers which provides a high level of macromolecular control over the polymerization process and which leads to uniform and more controllable polymeric products. It would be especially desirable to provide such a living polymerization process with existing facility, and which enables the use of a wide variety of readily available starting materials and catalysts.

SUMMARY OF THE INVENTION

In accordance with one embodiment of the invention, a process for polymerization of vinyl monomers is described comprising polymerizing vinyl monomers in the presence of an initiating system comprising (i) an organic sulfur compound and (ii) an onium salt catalyst.

The present invention provides a novel method for living polymerization of vinyl monomers, which provides a high level of macromolecular control over the polymerization process and which leads to uniform and controllable polymeric products. Oil soluble monomers may be polymerized in organic solvent or water-organic two phase solvent systems, while water soluble monomers may be polymerized in water or water-organic two phase solvent systems.

DETAILED DESCRIPTION OF THE INVENTION

According to the present invention, a novel polymerization process is described for conducting polymerization of monomers, particularly "living" polymerization of alkenes, wherein a novel initiating system is provided for producing oligomers and polymers with controlled structure. In the context of the present invention, the term "living" refers to the ability to produce a product having one or more properties which are reasonably close to their predicted value. The polymerization is said to be "living" if the resulting number average molecular weight is close to the predicted molecular weight based on the ratio of the concentration of the consumed monomer to the one of the initiator; e.g., within an order of magnitude, preferably within a factor of five, more preferably within a factor of 3, and most preferably within a factor of two, and to produce a product having narrow molecular weight distribution as defined by the ratio of weight average molecular weight to number molecular weight (MWD); e.g., less than 10, preferably less than 2, more preferably less than 1.5, most preferably less than 1.3. Moreover, compared with conventional polymerization, the conversion of the monomer in "living" polymerization is higher, e.g., higher than 10%, preferably higher than 30%, more preferably higher than 50%, most preferably higher than 80%.

In the present invention, the polymerization initiating system comprises (i) an organic sulfur compound and (ii) an onium salt catalyst. The organic sulfur compound employed in the initiating system is not required to be able to induce "living" polymerization as defined herein by itself, or in many instances even polymerization. However, the combination of organic sulfur compound and onium salt leads to a novel initiating system which enables polymerization to proceed in a "living" way. Such combination thus enables use of a wider variety of organic sulfur compounds as initiators than previously reported for living polymerization processes.

In a particular embodiment of the invention, the organic sulfur compound employed in the initiating system in the process of the invention may be selected from any organic sulfur compound with the following formulae I, II, III or IV:

$$R^1-S-R^2 \quad (I)$$

$$R^1-S-S-R^2 \quad (II)$$

$$R^1-C(=S)-S-R^2 \quad (III)$$

$$R^1-C(=S)-S-S-C(=S)-R^2 \quad (IV)$$

where $R^1$ and $R^2$ are independently selected from the following group: substituted or non-substituted alkyl, substituted or non-substituted aryl, substituted or non-substituted cycloalkyl, hetero-atom containing substituted or non-substituted alkyl, hetero-atom containing substituted or non-substituted aryl, hetero-atom containing substituted or non-substituted cycloalkyl, $NR^3R^4$, $SR^5$, $OR^6$, $C(O)R^7$, or $C(O)OR^8$, where $R^3$, $R^4$, $R^5$, $R^6$, $R^7$ and $R^8$ are substituted or non-substituted alkyl, substituted or non-substituted aryl, substituted or non-substituted cycloalkyl, hetero-atom containing substituted or non-substituted alkyl, hetero-atom containing substituted or non-substituted aryl, or hetero-atom containing substituted or non-substituted cycloalkyl.

Specific examples of organic sulfur compounds which may be employed in the initiating system in the process of the invention include but are not limited to:

$(C_2H_5)_2NC(=S)-S-S-C(=S)N(C_2H_5)_2$ "tetraethylthiuram disulfide", $C_6H_5-S-C(O)CH_3$ "s-phenyl thioacetate", $(CH_3)_2C(-S-Ph)COOC_2H_5$, $(CH_3)_2C(-S-C(=S)OC_2H_5)COOC_2H_5$, $(CH_3)_2C(-S-C(=S)N(C_2H_5)_2)COOC_2H_5$.

Various onium salts can be used in the present invention, such as any of the onium salts described in *Phase-Transfer Catalysis, Fundamentals, Applications, and Industrial Perspectives* (Starks, et al. Chapman & Hall, New York, 1994). Such onium salts can be selected from the group with the formula $W^+X^{\prime -}$ where $W^+$ is a salt cationic onium ion group containing $N^+$, $P^+$, $S^+$, $As^+$, or $Sb^+$ element, and $X^{\prime -}$ is a counter-anion. Onium salt counter-anion $X^{\prime -}$ and can be selected, e.g., from the group consisting of $Cl^-$, $Br^-$, $I^-$, $NO_3^-$, $NO_2^-$, $ClO_3^-$, $BrO_3^-$, $IO_3^-$, $ClO_4^-$, $MnO_4^-$, $ReO_4^-$, $IO_4^-$, $CrO_4^{-2}$, nolybdate, tungstate, vanadate, borate, $SO_4^{-2}$, $S^{-2}$, $S_2O_3^{-2}$, arsentite, arsenate, selenite, tellurite, $(CO_2^-)_2$, $CO_3^{-2}$, $F^-$, $CH_3CO_2^-$, $C_6H_5CO_2^-$, $SCN^-$, $MeSO_3^-$, $N_3^-$, $Br_3^-$, $OH^-$, $CN^-$, picrate, nitrate, acetate, sulfate.

Preferred onium salts include but are not limited to: $Me_4N^+Br^-$, $Pr_4N^+Br^-$, $Bu_4N^+Br^-$, $Bu_4P^+Br^-$, $Bu_4N^+Cl^-$, $Bu_4N^+F^-$, $Bu_4N^+I^-$, $Bu_4P^+Cl^-$, $(C_8H_{17})_3NMe^+Cl^-$, $(C_8H_{17})_3PEt^+Br^-$, $C_6H_{13}NEt_3^+Br^-$, $C_7H_{17}NEt_3^+Br^-$, $C_{10}H_{20}NEt_3^+Br^-$, $C_{12}H_{25}NEt_3^+Br^-$, $C_{16}H_{33}NEt_3^+Br^-$, $C_6H_{13}PEt_3^+Br^-$, $C_6H_5CH_2NEt_3^+Br^-$, $C_{16}H_{33}PMe_3^+Br^-$, $(C_6H_5)_4P^+Br^-$, $(C_6H_5)_4As^+Cl^-$, $(C_6H_5)_4As^+Br^-$, $(C_6H_5)_3PMe^+Br^-$, $(HOCH_2CH_2)_3NBu^+Br$, $Bu_4N^+OH^-$, $Bu_4N^+(ClCrO_3)^-$, $Bu_4N^+CN^-$, $Bu_4N^+BH_3CN^-$, $Bu_4N^+(H_2PO_4)^-$, $Bu_4N^+(H_2PO_2)^-$, $Bu_4N^{+1/2}(PtCl_6)^-$, $Bu_4N^+PF_6^-$, $Bu_4N^+HSO_4^-$, $Bu_4N^+[CH_3CH(OH)CO_2]$, $Bu_4N^+NO_3^-$, $Bu_4N^+IO_4^-$, $Bu_4N^+ReO_4^-$, $Bu_4N^+BF_4^-$, $Bu_4N^+[B(C_6H_5)_4]^-$, $Bu_4N^+[CF_3SO_3]^-$,

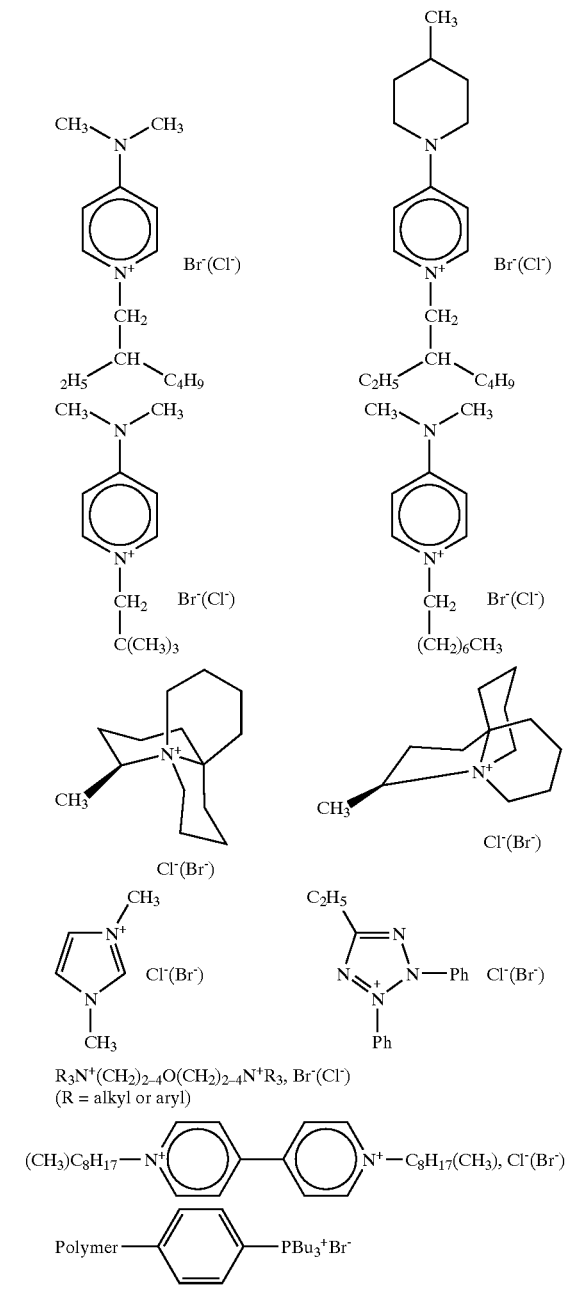

-continued

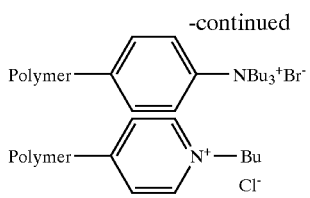

Additional onium salts which may be used include other so-called ionic liquids as described in *Chemical Review* (Welton, 99, 2071 (1999)).

In addition to "ordinary" onium salts as described above, onium salts employed in the process of the invention may comprise onium salt complexes of the type described in U.S. Pat. No. 6,310,165. Such complexes can be selected from the group with the formula: $[MX'Y]^-W^+$, which results from reaction between an onium salt of the formula $W^+X'^-$ such as described above with a transition metal species of the formula MY, where M is a transition metal atom with a formal charge of from 0–7, and Y is one or more counter-anion or coordinative ligand. The transition metal M which may be selected, e.g., from the group consisting of Ag, Au, Cu, Co, Cr, Fe, Hg, Ir, Mo, Nb, Ni, Os, Pd, Pt, Re, Rh, Ru, Tb, Ta, V, W, and Zn. Counter-anions which may be used for Y may be selected, e.g., from those set forth for $X'^-$ above, and representative coordinative ligands may be, e.g., (CO), cyclopentadienyl, and cyclooctadiene.

The onium salt can be used in a total amount of 0.01 to 100 moles, preferably 0.05 to 10 moles, more preferably 0.1 to 5 moles, most preferably 0.2 to 2 moles per mole of the organic sulfur compound.

Organic sulfur compounds employed in the process of the invention may be preformed, or may be generated in situ in a polymerization reaction vessel by addition of an organic halide compound and a sulfur salt compound in the presence of a phase transfer catalyst. Any organic halide, R—X, may be employed where R is any organic moiety and X is Cl, Br or I. Examples of organic halide compounds include but are not limited to ethyl 2-bromoisobutyrate, ethyl 2-iodoisobutyrate, diethyl 2-bromo-2-methylmalonate, diethyl 2-iodo-2-methylmalonate, 2-chloropropionitrile, 2-bromopropionitrile, 2-iodopropionitrile, 2-bromo-2-methylpropionic acid, 2-bromoisobutyrophone, ethyl trichloroacetate, 2-bromoisobutyryl bromide, 2-chloroisobutyryl chloride, α-bromo-α-methyl-γ-butyrolactone, p-toluenesulfonyl chloride and its substituted derivatives, 1,3-benzenedisulfonyl chloride, carbon tetrachloride, carbon tetrabromide, chloroacetonitrile, iodoacetonitrile, tribromoethanol, tribromoacetyl chloride, trichloroacetyl chloride, tribromoacetyl bromide, chloroform, 1-phenyl ethylchloride, 1-phenyl ethylbromide, 2-chloropropionic acid, 2-bromoisobutyric acid, 4-vinyl benzene sulfonyl chloride, vinyl benzenechloride, 2-chloroisobutyrophenone, and 2-bromoisobutyrophenone. Any sulfur salt compound can be selected which will react with R—X to form an organic sulfur compound under phase transfer catalysis (PTC). Examples of sulfur salt compounds which may be employed include but are not limited to $Na[SC(=S)N(C_2H_5)_2]$, $K[SC(=S)OC_2H_5]$, $K[S-C_6H_5]$.

Phase transfer catalysts which may be used for the in situ formation of an organic sulfur compound in the initiating system in accordance with one embodiment of the process of the invention in the present invention are likewise well-known. They can be selected, e.g., from any phase transfer catalysts set forth in Starks, et al. *Phase-Transfer Catalysis, Fundamentals, Applications, and Industrial Perspectives*, Chapman & Hall, New York, 1994, or other resources. In general, phase transfer catalysts which may be used include any onium salts as described above and chelating agents. In a preferred embodiment of the invention, when the organic sulfur compound is to be formed in situ, the same onium salt compound employed in the initiating system may be used as the phase transfer catalyst.

Any chelating agents which can facilitate the reaction between a sulfur salt compound and an organic compound R—X can alternatively be used in the present invention as phase transfer agent. Examples of these chelating agents include but are not limited to polyethylene glycol and derivatives such as $HO(CH_2CH_2O)_nH$ (n=2–600), $RO(CH_2CH_2O)H$ where R=$C_1$ to $C_{13}$ alkyl groups, $N(CH_2CH_2OCH_2CH_2OCH_3)_3$, $N(CH_2CH_2OCH_2CH_2OH)_3$, crown ethers and cryptands such as 18-crown-5, 15-crown-5, dibenzo-18-crown-6, dicyclohexano-18-crown-6, Kryptand 211, Kryptand 222, Kryptand 221.

The phase transfer reaction can be carried out before adding monomer and polymerization catalyst or during the course of the polymerization. Moreover, the phase transfer reaction may be carried out in one, or more than one phases. The sulfur salt compound in such embodiment can be used in a total amount of 0.01 to 100 moles, preferably 0.1 to 10 moles, more preferably 0.2 to 5 moles, most preferably 0.4 to 3 moles per mole of the R—X initiator precursor. The phase transfer catalyst can be used in a total amount of 0.01 to 100 moles, preferably 0.1 to 10 moles, more preferably 0.2 to 5 moles, most preferably 0.4 to 3 moles per mole of the R—X initiator precursor.

In the present invention, polymers with various specifically desired structures and architectures can be purposely produced. In terms of topology, such structures and architectures may include: linear, star, comb, hyperbranched, dendritic, cyclic, network, and the like. In terms of sequence/composition distribution such structures and architectures may include: homopolymer, random copolymer, block copolymer, graft copolymer, gradient copolymer, tapered copolymer, periodic copolymer, alternating copolymer, and the like.

In the present invention, any vinyl monomers can be polymerized and/or copolymerized in the presence of the above-mentioned initiating system. Examples of the monomers include but not limited to: carboxyl group-containing unsaturated monomers such as acrylic acid, methacrylic acid, crotonic acid, itaconic acid, maleic acid, fumaric acid, and the like (preferably methacrylic acid), $C_{2-8}$ hydroxyl alkyl esters of (meth)acrylic acid (preferably methacrylic acid) such as 2-hydroxylethyl (meth)acrylate, 2-hydroxylpropyl (meth)acrylate, 3-hydroxypropyl (meth)acrylate, hydroxybutyl (meth)acrylate and the like, monomesters between a polyether polyol (e.g., polyethylene glycol, polypropylene glycol or polybutylene glycol) and an unsaturated carboxylic acid (preferably methacrylic acid); monoethers between a polyether polyol (e.g., polyethylene glycol, polypropylene glycol or polybutylene glycol) and a hydroxyl group-containing unsaturated monomers (e.g., 2-hydroxyl methacrylate); adducts between an unsaturated carboxylic acid and a monoepoxy compound; adducts between glycidyl (meth)acrylates (preferably methacrylate) and a monobasic acid (e.g., acetic acid, propionic acid, p-t-butylbenzonic acid or a fatty acid); monoesters or diesters between an acid anhydride group-containing unsaturated compounds (e.g., maleic anhydride or itaconic anhydride) and a glycol (e.g. ethylene glycol, 1,6-hexanediol or neopentyl glycol); chlorine-, bromine-, fluorine-, and hydroxyl group containing monomers such as 3-chloro-2-hydroxylpropyl (meth)acrylate (preferably methacrylate)

and the like; $C_{1-24}$ alkyl esters or cycloalkyl esters of (meth)acrylic acid (preferably methacrylic acid), such as methyl methacrylate, ethyl methacrylate, propyl methacrylate, isopropyl methacrylate, n-, sec-, or t-butyl methacrylate, hexyl methacrylate, 2-ethylhexyl methacrylate, octylmethacrylate, decyl methacrylate, lauryl methacrylate, stearyl methacrylate, cyclohexyl methacrylate and the like, $C_{2-18}$ alkoxyalkyl esters of (meth)acrylic acid (preferably methacrylic acid), such as methoxybutyl methacrylate, methoxyethyl methacrylate, ethoxyethyl methacrylate, ethoxybutyl methacrylate and the like; olefines or diene compounds such as ethylene, propylene, butylene, isobutene, isoprene, chloropropene, fluorine containing olefins, vinyl chloride, and the like; ring-containing unsaturated monomers such as styrene and o-,m-,p-substitution products thereof such as N,N-dimethylaminostyrene, aminostyrene, hydroxystyrene, t-butylstyrene, carboxystyrene and the like, a-methyl styrene, phenyl (meth)acryltes, nitro-containing alkyl (meth) acrylates such as N,N-dimethyl-aminoethyl methacrylate, N-t-butylaminoethyl methacrylate; 2-(dimethylamino)ethyl methacrylate, methyl chloride quaternized salt, and the like; polymerizable amides such as (meth)acrylamide, N-methyl (meth)acrylamide, 2-acryloamido-2-methyl-1-propanesulfonic acid, and the like; nitrogen-containing monomers such as 2-, 4-vinyl pyridines, 1-vinyl-2-pyrrolidone, (meth)acrylonitrile, and the like; glycidyl group-containing vinyl monomers such as glycidyl (meth) acrylates and the like, vinyl ethers, vinyl acetate, and cyclic monomers such as methyl 1,1-bicyclobutanecarboxylate. These monomers can be used singly or as admixture of two or more than two.

Vinyl terminated macromonomers, such as any of those which are defined in "Chemistry and Industry of Macromonomers" (Yamashita, Huthig & Wepf, New York 1993), can also be used in the present invention. The preferable macromonomers are those terminated with methacrylate groups. Examples of such macromonomers include, but are not limited to, poly(ethylene oxide) methacrylate, poly (styrene) methacrylate, poly(siloxane) methacrylate, poly ((meth)acrylic acid) methacrylate, and poly(alkyloxazoline) methacrylate.

A polymerizable quaternized monomer or monomers (e.g., 2-(dimethylamino)ethyl methacrylate , methyl chloride quaternized salt, and the like) may also be employed in the process of the present invention, and it may be unnecessary to use additional "ordinary" onium salt in combination with the organic sulfur compound. In such case, "living" polymerization of quaternized monomer can be considered as a monomer self-catalyzed polymerization.

The above polymerizable monomer or monomers can be used in a total amount of generally from 3–20,000 moles, preferably 5–2,000 moles, more preferably 10–1,000 moles per mole of the organic sulfur compound initiator. The molecular weight distribution of resultant polymer (defined by the ratio of weight average molecular weight to number average molecular weight) obtained from processes of the present invention is generally from 1.01 to 30, mostly from 1.05 to 3.0, and more preferably less than 2.0.

Various organic or inorganic functional groups can be introduced to the ends of formed polymer or copolymer. By definition, a functional group is a moiety attached to a molecule that performs a function in terms of the reactivity and/or the physical properties of the molecule bearing it. Example of functional groups include but not limited to: halogens (e.g., Cl, Br, I), hydroxyl (—OH) groups such as —$CH_2OH$, —$C(CH_3)_2OH$, —$CH(OH)CH_3$, phenol and the like, thiol (—SH) groups, aldehyde (—CHO) and ketone (>C=O) groups, amine (—$NH_2$) groups, carboxylic acid and salt (—COOM) (M is H, alkali metal or ammonium), sulfonic acid and salt (—$SO_3M$) (M is H, alkali metal or ammonium), amide (—$CONH_2$), crown and kryptand, substituted amine (—$NR_2$) (R is H or $C_{1-18}$ alkyl), —C=CR', —CH=CHR'(R' is H or alkyl or aryl or alkaryl or aralkyl or combinations thereof), —COX (X is halogen), —$CH_2N$ $(SiR'_3)_2$, —$Si(OR')_3$, —CN, —$CH_2NHCHO$, —$B(OR)_2$, —$SO_2Cl$, —$N_3$, —MgX. Functionalized polymer and copolymers including macromonomer prepared in accordance with the invention may be obtained by two ways: (a) one-pot synthesis using functional initiator; (b) transformation of living or preformed polymer to a desirable functional group by known organic reactions.

Various polymerization technologies can be used to make the polymer, which include but not limited to: bulk polymerization, solution polymerization, emulsion polymerization, suspension polymerization, dispersion polymerization, precipitation polymerization, template polymerization, micro-emulsion polymerization. Various solvents can be used in the polymerization. Examples of the solvents are but not limited to: water, aliphatic solvent, aromatic solvent, hetero-atom containing solvent, supercritical solvent (such as $CO_2$), and the like. The inventive process can typically be conducted between −80° C. and 280° C., preferably between 0° C. and 180° C., more preferably between 20° C. and 150° C., most preferably between 20° C. and 130° C. The inventive process can be conducted under a pressure from 0.1 to 50,000 kPa, preferably from 1 to 1,000 kPa. The addition order of various ingredients in according with the process of the invention can vary and generally do not affect the outcome of the "living" polymerization. Depending the expected molecular weight and other factors, polymerization time may vary from 10 seconds to 100 hours, preferably from 1 minute to 48 hrs, more preferably from 10 minutes to 24 hrs, most preferably from 30 minutes to 18 hrs.

The final polymer can be used as it is or is further purified, isolated, and stored. Purification and isolation may involve removing residual monomer, solvent, and catalyst. The purification and isolation process may vary. Examples of isolation of polymers include but not limited to precipitation, extraction, filtration, and the like. Final polymer product can also be used without further isolation such as in the form of the latex or emulsion.

Polymers prepared with the inventive process may be useful in a wide variety of applications. The examples of these applications are but not limited to: adhesives, dispersants, surfactants, emulsifiers, elastomers, coating, painting, thermoplastic elastomers, diagnostic and supporters, engineering resins, ink components, lubricants, polymer blend components, paper additives, biomaterials, water treatment additives, cosmetics components, antistatic agents, food and beverage packaging materials, release compounding agents in pharmaceuticals applications.

EXAMPLES

Example 1

An organic sulfur compound initiator, $(CH_3)_2C(SC(=S)N(C_2H_5)_2)COOC_2H_5$, was synthesized by reacting 0.036 mol of ethyl 2-bromoisobutyrate with 0.046 mol of sodium N,N,-diethyldithiocarbamate in 60 ml ethanol at room temperature. The initiator was stored as a 65 wt % solution in benzene.

The following agents were weighted into a three necks round flask equipped with a condenser and magnetic stirring bar under ambient atmosphere: 5 grams of methyl methacrylate, 5 grams of DMPU, 0.13 grams of $(CH_3)_2C(SC(=S)N(C_2H_5)_2)COOC_2H_5$ (0.00049 mol), and 0.16 grams of $Bu_4NBr$ (0.0005 mol). After purging the solution with inert nitrogen gas for 30 minutes, the flask was covered and placed in a pre-heated oil bath at 80° C. After 16 hrs, an aliquot of solution was picked out and dissolved in $CDCl_3$ to determine the conversion. The conversion is 96%. Polymer was then isolated by precipitating from methanol. The polymer was characterized by means of SEC with number average molecular weight (Mn) and molecular weight distribution Mw/Mn being 43,300 and 1.8, respectively.

Example 2

The following agents were weighted into a three-neck round flask equipped with a condenser and magnetic stirring bar under ambient atmosphere: 5 grams of methyl methacrylate, 5 ml of 1,3-dimethyltetrahydro-2(1H) pyrimidone (DMPU), 0.15 grams of tetraethylthiuram disulfide (TETD) (0.0005 mol), 0.3 grams of $Bu_4NBr$ (0.001 mol). After purging the solution with inert nitrogen gas for 15 minutes, the flask was covered and placed in a pre-heated oil bath at 70° C. After 44 hrs, the polymer was isolated by precipitating from methanol. Convention based on $^1H$ NMR in $CDCl_3$: 44%. The polymer was characterized by means of SEC with number average molecular weight (Mn) and molecular weight distribution Mw/Mn using polystyrene as calibration standard: Mn: 17600, and Mw/Mn: 1.23. The calculated Mn based on TETD: 4400.

Example 3

The experiment is similar to the one in example 2, except that 0.3 grams of TETD was used and polymerization was run for 90 hrs. The monomer conversion is 65%. The number average molecular weight (Mn) and molecular weight distribution Mw/Mn are 15,900 and 1.3, respectively.

Example 4

The following agents were weighted into a three necks round flask equipped with a condenser and magnetic stirring bar under ambient atmosphere: 5 grams of methyl methacrylate, 3 grams of anisol, 0.152 grams of s-phenyl thioacetate (0.001 mol), 0.32 grams of $Bu_4NBr$ (0.001 mol). After purging the solution with inert nitrogen gas for 30 minutes, the flask was covered and placed in a pre-heated oil bath at 80° C. After 17 hrs, the polymerization was stopped by lowering down to room temperature. Polymer was then isolated by precipitating from methanol. Convention (1H NMR): 16%. The polymer was characterized by means of SEC with number average molecular weight (Mn) and molecular weight distribution Mw/Mn being 381,000 and 1.60, respectively. The calculated Mn is 1000.

Example 5

The following agents were weighted into a three necks round flask equipped with a condenser and magnetic stirring bar under ambient atmosphere: 10 grams of styrene, 10 grams of DMPU, 0.2 grams of $(CH_3)_2C(SC(=S)N(C_2H_5)_2)COOC_2H_5$ (0.00075 mol), and 0.16 grams of $Bu_4NBr$ (0.0005 mol). After purging the solution with inert nitrogen gas for 30 minutes, the flask was covered and placed in a pre-heated oil bath at 80° C. After 5 hrs, an aliquot of solution was picked out and dissolved in $CDCl_3$ to determine the conversion. The conversion is 18%. Polymer was then isolated by precipitating from methanol. The polymer was characterized by means of SEC with number average molecular weight (Mn) and molecular weight distribution Mw/Mn being 25,400 and 2.7, respectively.

Comparative Example 1

Example 1 was repeated, except without using the organic sulfur compound initiator, $(CH_3)_2C(SC(=S)N(C_2H_5)_2)COOC_2H_5$. No polymer was obtained.

Comparative Example 2

Example 1 was repeated, except without using the onium salt $Bu_4NBr$. No polymer was obtained.

The invention has been described in detail with particular reference to preferred embodiments thereof, but it is to be understood that variations and modifications can be effected within the spirit and scope of the invention.

What is claimed is:

1. A process for polymerization of vinyl monomers comprising polymerizing vinyl monomers in the presence of an initiating system comprising (i) an organic sulfur compound and (ii) an onium salt catalyst.

2. The process of claim 1, wherein the organic sulfur compound comprises a compound of the following formulae I, II, III or IV:

  (I)

  (II)

  (III)

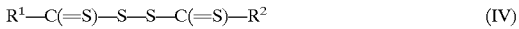  (IV)

where $R^1$ and $R^2$ are independently selected from the following group: substituted or non-substituted alkyl, substituted or non-substituted aryl, substituted or non-substituted cycloalkyl, hetero-atom containing substituted or non-substituted alkyl, hetero-atom containing substituted or non-substituted aryl, hetero-atom containing substituted or non-substituted cycloalkyl, $NR^3R^4$, $SR^5$, $OR^6$, $C(O)R^7$, or $C(O)OR^8$, where $R^3$, $R^4$, $R^5$, $R^6$, $R^7$ and $R^8$ are substituted or non-substituted alkyl, substituted or non-substituted aryl, substituted or non-substituted cycloalkyl, hetero-atom containing substituted or non-substituted alkyl, hetero-atom containing substituted or non-substituted aryl, or hetero-atom containing substituted or non-substituted cycloalkyl.

3. The process of claim 2, wherein the organic sulfur compound comprises a compound of formula (I).

4. The process of claim 2, wherein the organic sulfur compound comprises a compound of formula (II).

5. The process of claim 2, wherein the organic sulfur compound comprises a compound of formula (III).

6. The process of claim 2, wherein the organic sulfur compound comprises a compound of formula (IV).

7. The process of claim 1, wherein the organic sulfur compound comprises tetraethylthiuram disulfide, s-phenyl thioacetate, $(CH_3)_2C(SPh)COOC_2H_5$, $(CH_3)_2C(SC(=S)OC_2H_5)COOC_2H_5$, or $(CH_3)_2C(SC(=S)N(C_2H_5)_2)COOC_2H_5$.

8. The process of claim 1, wherein the onium salt comprises a compound of the formula $W^+X'^-$, where $W^+$ is a cationic onium ion group containing $N^+$, $P^+$, $S^+$, $As^+$, or $Sb^+$ element, and $X'^-$ is a counter-anion comprising $Cl^-$, $Br^-$, $I^-$, $NO_3^-$, $NO_2^-$, $ClO_3^-$, $BrO_3^-$, $IO_3^-$, $ClO_4^-$, $MnO_4^-$, $ReO_4^-$, $IO_4^-$, $CrO_4^{-2}$, nolybdate, tungstate, vanadate, borate, $SO_4^{-2}$, $S^{-2}$, $S_2O_3^{-2}$, arsenite, arsenate, selenite, tellurite, $(CO_2^-)_2$, $CO_3^{-2}$, $F^-$, $CH_3CO_2^-$, $C_6H_5CO_2^-$, $SCN^-$, $MeSO_3^-$, $N_3^-$, $Br_3^-$, $OH^-$, $CN^-$, picrate, nitrate, acetate, or sulfate.

9. The process of claim 1, wherein the onium salt comprises $Me_4N^+Br^-$, $Pr_4N^+Br^-$, $Bu_4N^+Br^-$, $Bu_4P^+Br^-$, $Bu_4N^+Cl^-$, $Bu_4N^+F^-$, $Bu_4N^+I^-$, $Bu_4P^+Cl^-$, $(C_8H_{17})_3NMe^+Cl^-$, $(C_8H_{17})_3PEt^+Br^-$, $C_6H_{13}NEt_3^+Br^-$, $C_7H_{17}NEt_3^+Br^-$ $C_{10}H_{20}NEt_3^+Br^-$, $C_{12}H_{25}NEt_3^+Br^-$, $C_{16}H_{33}NEt_3^+Br^-$, $C_6H_{13}PEt_3^+Br^-$, $C_6H_5CH_2NEt_3^+Br^-$, $C_{16}H_{33}PMe_3^+Br^-$, $(C_6H_5)_4P^+Br^-$, $(C_6H_5)_4As^+Cl^-$, $(C_6H_5)_4As^+Br^-$, $(C_6H_5)_3PMe^+Br^-$, $(HOCH_2CH_2)_3NBu^+Br$, $Bu_4N^+OH^-$, $Bu_4N^+(ClCrO_3)^-$, $Bu_4N^+CN^-$, $Bu_4N^+BH_3CN^-$, $Bu_4N^+(H_2PO_4)^-$, $Bu_4N^+(H_2PO_2)^-$, $Bu_4N^+½(PtCl_6)^-$, $Bu_4N^+PF_6^-$, $Bu_4N^+HSO_4^-$, $Bu_4N^+[CH_3CH(OH)CO_2]^-$, $Bu_4N^+NO_3^-$, $Bu_4N^+IO_4^-$, $Bu_4N^+ReO_4^-$, $Bu_4N^+HSO_4^-$, $Bu_4N^+[CH_3CH(OH)CO_2]^-$, $Bu_4N^+NO_3^-$, $Bu_4N^+IO_4^{Bu}{}_4N^+[B(C_6H_5)_4]^-$, $Bu_4N^+[CF_3SO_3]^-$,

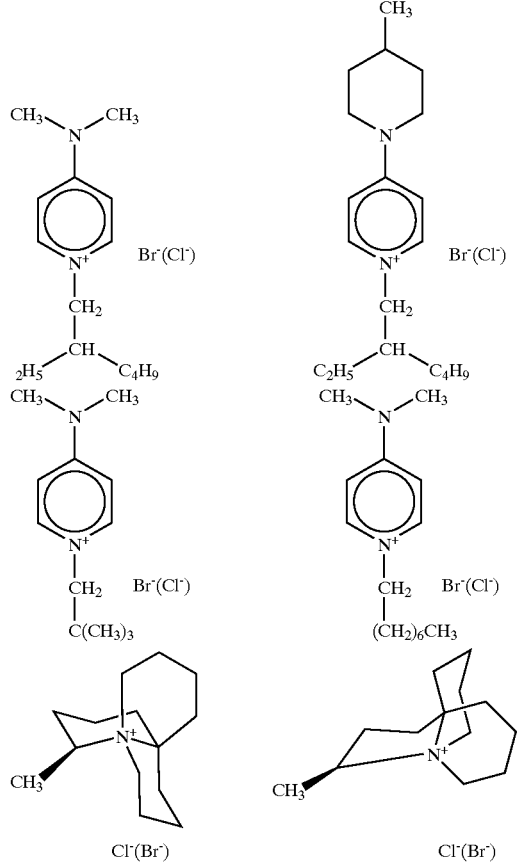

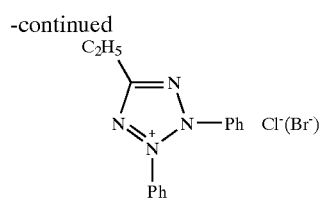

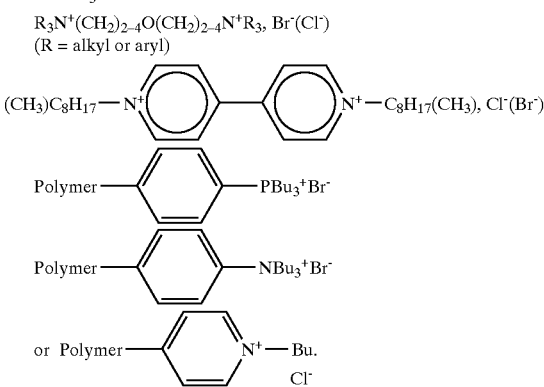

$R_3N^+(CH_2)_{2-4}O(CH_2)_{2-4}N^+R_3$, $Br^-(Cl^-)$
(R = alkyl or aryl)

10. The process of claim 1, wherein the onium salt is used in a total amount of 0.05 to 10 moles per mole of the organic sulfur compound.

11. The process of claim 1, wherein the monomers are used in a total amount of from 3–20,000 moles per mole of the organic sulfur compound.

12. The process of claim 1, wherein the organic sulfur compound present during the polymerization is formed in situ by reacting an organic halide compound with a sulfur salt compound under phase transfer catalysis in the presence of a phase transfer agent.

13. The process of claim 12, wherein the phase transfer agent comprises the same onium salt as that of the initiating system.

14. A polymer made from the process of claim 1.

* * * * *